Nov. 18, 1941.    G. H. SCHIEFERSTEIN    2,263,521
RUBBER SPRING ARRANGEMENT
Filed May 22, 1937
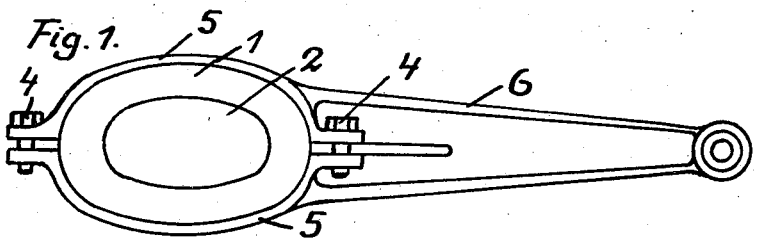
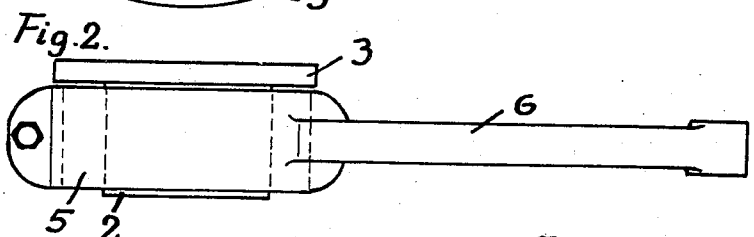
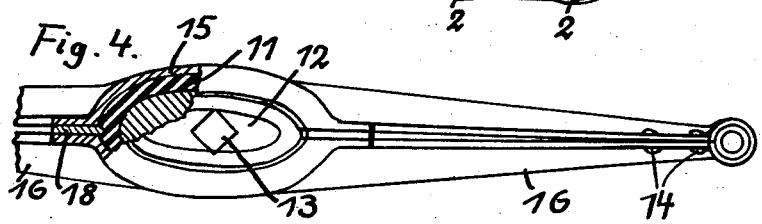
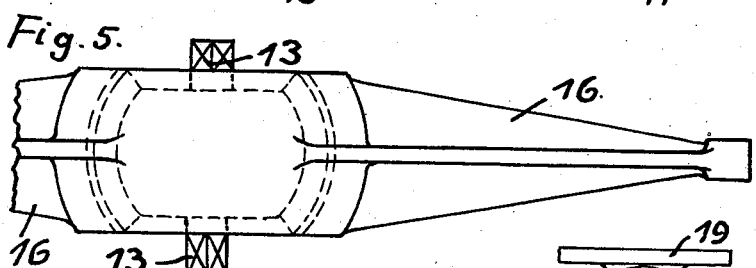
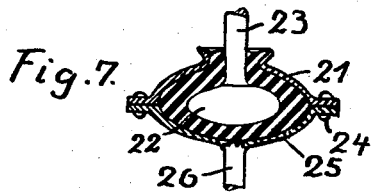
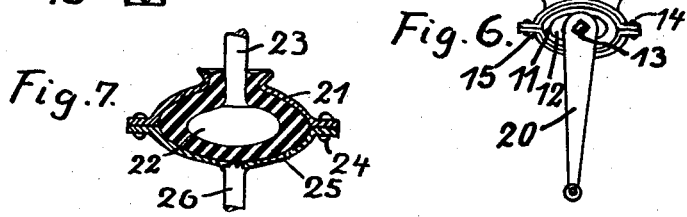
Georg Heinrich Schieferstein
Inventor:
By Otto Munk
his Atty.

Patented Nov. 18, 1941

2,263,521

UNITED STATES PATENT OFFICE 2,263,521

RUBBER SPRING ARRANGEMENT

Georg Heinrich Schieferstein, Berlin-Charlottenburg, Germany

Application May 22, 1937, Serial No. 144,319
In Germany February 8, 1937

4 Claims. (Cl. 267—21)

The invention relates to a spring arrangement of rubber or similar elastic media, the essential feature residing in the fact that an elliptic annular space between two elliptical bodies of different shape, located one within the other, is filled with rubber or substitute products thereof and to the elliptical bodies power transmitting members are so connected that they by twisting of the elliptical bodies cause the rubber to be partly subjected to shearing, partly to pressure and partly to tension. The resulting combined straining of the rubber produces a very extraordinary high utilisation of the rubber-spring properties and thus the possibility of obtaining an unsuspected high spring action with comparatively small quantities of rubber. Where a yielding property in a number of directions is necessary favourable further developments are obtained wherein the rubber body is elliptically shaped in two or all three longitudinal dimensions, so that it simulates somewhat the form of a lens or an ellipsoid with corresponding shaping of the inner core and the outer wall.

Separate actions are obtainable by placing the spring body under a pressure pre-strain, for example by contracting the outer ellipse body formed of subdivisions. In this manner sliding of the rubber or the metal, of which there is a particular rick in the case of nearly circular ellipses, is avoided with greater certainty.

Particular details of an important nature also occur when the spring body is vulcanised to the ellipse bodies or is otherwise secured so as to adhere thereto, and further when one or more pairs of ellipse bodies are combined with their levers into a unit in the form of a spring acting as a blade spring.

Several examples of construction according to the invention are shown by way of example in the accompanying drawing, wherein:

Figs. 1 and 2 show a side elevation and plan of a spring body with an external lever, Fig. 3 shows a side elevation of a pair of spring bodies arranged one behind the other so as to act as a long blade spring, Figs. 4 and 5 show in side elevation and plan a spring body, which at one section is circular and at another section elliptical, with a double lever, in an unfinished state, Fig. 6 shows a view of a similar spring body with a securing bracket on the outer wall and a simple lever attached to the core, Fig. 7 is a longitudinal section of an elliptical spring body fitted between two rods.

In Figs. 1 and 2 an elliptical rubber ring 1 is fitted on an internal elliptical body or core 2, which for example is constructed as a plug with a securing flange 3, for securing to a vehicle frame or other body to be resiliently mounted. Over the outside of the spring body 1 is fitted an outer elliptical body or casing 5, composed of two half shells capable of being clamped together by bolts 4, which is formed into a lever 6. The parts 1, 2, 5 are vulcanised together. By drawing together the half shells 5 the spring body can be set under the desired pre-tension, this being also capable of being effected during operation, for which purpose the stationary internal elliptic body 2 may be constructed so as to be capable of spreading.

In Fig. 3 two cores 2, fitted with spring bodies 1, are connected together on one or both sides by connecting plates 7, and the levers 7 are arranged oppositely to one another so that the whole is equivalent in action to a long blade spring.

In Figs. 4 and 5 the rubber body 11 is formed in the vertical longitudinal section as an elliptical ring and in horizontal cross-section as a ring sector, so that with a fundamental action similar to the examples first described it also has in addition a considerable resiliency in the plane of its outline (Fig. 5). A core 12 of corresponding shape carries, in this case, on both sides square pivots 13 for fitting into a bearing bracket. Casing halves 15, also of a shape corresponding with the spring body 11, are in this case secured together with pre-tension by rivets 14 and carry two lever arms 16, which together form a double-armed lever. A two or multipart ring 18 is preliminary inserted between the half shells of the casing 15 in such a manner during the making of the rubber filling that it enlarges the space intended for the rubber and projects with a slight arching into said space and forms a constriction in the rubber. In this manner the rubber on being compressed (after taking out the annular member 18) receives a pressure pre-strain and the effect of the constriction is to prevent the rubber between the half shells.

In Fig. 6 a rubber body 11, corresponding entirely with the previous one, is gripped between the correspondingly shaped core 12, 13 and casing 14, 15. In this case, however, the casing 14, 15 is connected directly to a securing bracket 19 and a lever 20 engages with the square portions 13 of the core 12.

In Fig. 7 there is used an elliptical rubber body 21, which thus has axes of different size in all longitudinal dimensions, whilst transversely thereto it has a circular cross-section. A correspondingly shaped elliptical core 22 is in the case secured to a rod 23 and by casing shells 25, secured together by rivets 24, it is connected to a second rod 26 which is located in alignment with the first rod 23. An arrangement of this character may for example serve as a hinged resilient thrust rod for printing presses, stamping presses and many other machines. It may also serve for example as the Cardan shaft of power vehicles.

An elliptical joint similar to Fig. 7 may also be provided with elliptic bodies having axes of three different sizes, and the supporting rod or the connecting plug of the core, instead of engaging with one of the flat sides of the ellipse, may on the contrary engage with one of the most curved edges thereof. In this manner it is possible to construct joints which are capable of transmitting the most diverse forces acting in any suitable directions. The resiliency is then always the smallest in the planes where the two axes of the ellipse have the greatest diversity.

By constructing the rubber layers of different thickness at different joints it is possible to further influence the desired ratios of resiliency or yieldability.

I claim:

1. A spring arrangement, comprising two essentially elliptical bodies of different size fitted one within the other so as to form an elliptical space between them, a filling of elastic material disposed in said space and adhesively secured to both said elliptical bodies, said filling being formed in one section as an elliptical ring and in at least one section at right angles to said first section as a ring sector, and power transmitting members so connected to said elliptical bodies that they allow the latter to be strained by twisting relatively to each other.

2. A spring arrangement, comprising two essentially elliptical bodies of different size fitted one within the other so as to form an elliptical space between them, a filling of elastic material disposed in said space and adhesively secured to both said elliptical bodies, said filling being formed as an elliptical ring in more than one section, and power transmitting members so connected to said elliptical bodies that they allow the latter to be strained by twisting relatively to each other.

3. A spring arrangement, comprising two essentially elliptical bodies of different size fitted one within the other so as to form an elliptical space between them, a filling of elastic material disposed in said space and adhesively secured to both said elliptical bodies, said filling being formed as a rotation ellipsoid of a shape similar to that of a lens, and power transmitting members so connected to said elliptical bodies that they allow the latter to be strained by twisting relatively to each other.

4. A spring arrangement, comprising two essentially elliptical bodies of different size fitted one within the other so as to form an elliptical space between them, a filling of elastic material disposed in said space and adhesively secured to both said elliptical bodies, said filling being formed in one section as an elliptical ring and in at least one section at right angles to said first section with a curved outline of the surfaces secured to the elliptical bodies, and power transmitting members so connected to said elliptical bodies that they allow the latter to be strained by twisting relatively to each other.

GEORG HEINRICH SCHIEFERSTEIN.